US009682611B2

(12) United States Patent
Haug

(10) Patent No.: US 9,682,611 B2
(45) Date of Patent: Jun. 20, 2017

(54) AIR CONDITIONING SYSTEM

(71) Applicant: MAHLE International GmbH, Stuttgart (DE)

(72) Inventor: Joachim Haug, Mundelsheim (DE)

(73) Assignee: MAHLE International GmbH, Stuttgart (DE)

( * ) Notice: Subject to any disclaimer, the term of this patent is extended or adjusted under 35 U.S.C. 154(b) by 197 days.

(21) Appl. No.: 14/539,619

(22) Filed: Nov. 12, 2014

(65) Prior Publication Data

US 2015/0266359 A1    Sep. 24, 2015

(30) Foreign Application Priority Data

Mar. 18, 2014   (DE) ................. 10 2014 205 030

(51) Int. Cl.
*B60H 1/32* (2006.01)
*B60H 1/00* (2006.01)

(52) U.S. Cl.
CPC ....... *B60H 1/3204* (2013.01); *B60H 1/00899* (2013.01); *B60H 2001/00928* (2013.01)

(58) Field of Classification Search
CPC .............. B60H 1/3204; B60H 1/00921; B60H 2001/00949
See application file for complete search history.

(56) References Cited

U.S. PATENT DOCUMENTS

| 4,716,741 | A * | 1/1988 | Bednarek ............... F25B 13/00 62/197 |
| 2008/0085672 | A1 * | 4/2008 | Creed ................. B60H 1/00207 454/69 |
| 2012/0174602 | A1 | 7/2012 | Olivier et al. |
| 2012/0205088 | A1 * | 8/2012 | Morisita ............ B60H 1/00921 165/202 |
| 2012/0247746 | A1 * | 10/2012 | Sakajo ............... B60H 1/00392 165/202 |
| 2012/0304674 | A1 * | 12/2012 | Schwarzkopf ..... B60H 1/00385 62/79 |
| 2013/0145790 | A1 * | 6/2013 | Schafer .............. B60H 1/00899 62/333 |
| 2013/0206360 | A1 | 8/2013 | Zhang et al. |
| 2013/0291577 | A1 * | 11/2013 | Miyakoshi ......... B60H 1/00392 62/151 |

FOREIGN PATENT DOCUMENTS

EP    1 291 206 A1    3/2003
JP    H 11-301254 A   11/1999

* cited by examiner

*Primary Examiner* — Emmanuel Duke
(74) *Attorney, Agent, or Firm* — Muncy, Geissler, Olds & Lowe, P.C.

(57) ABSTRACT

An air conditioning system, in particular for a motor vehicle, comprising a refrigerant circuit having at least one compressor, and comprising a coolant circuit having an external heat exchanger which is arranged in a heat pump system, wherein a redundant heat source is provided which is integrated in the heat pump system.

7 Claims, 2 Drawing Sheets

AIR CONDITIONING SYSTEM

This nonprovisional application claims priority to German Patent Application No. DE 10 2014 205 030.8, which was filed in Germany on Mar. 18, 2014, and which is herein incorporated by reference.

BACKGROUND OF THE INVENTION

Field of the Invention

The present invention relates to an air conditioning system, in particular for a motor vehicle.

Description of the Background Art

In motor vehicles, air conditioning systems are used for improving the comfort, in particular for providing a temperature that is pleasant for the driver. In a motor vehicle having an internal combustion engine, heating the interior of the motor vehicle is typically carried out via the engine's waste heat that is dissipated to a coolant circulating in a coolant circuit of the air conditioning system. In electric vehicles, which are operated by means of a battery, only little usable waste heat is generated at the electrical machine and the power electronics. Therefore, electrical auxiliary heaters are used, for example PTC (Positive Temperature Coefficient) heaters, which, however, consume additional electrical power, which, in turn, can result in a reduced range of the electric vehicle. For heating the interior of the motor vehicle, it is therefore an aim to provide a heat pump system for the air conditioning system present in the vehicle. The air conditioning system typically has a closed refrigerant circuit in which a refrigerant circulates, comprising a compressor, an evaporator, an expansion valve and at least one heat exchanger. The heat thereby released can be dissipated to a coolant which likewise circulates in a closed coolant circuit, and can be utilized for heating the interior of the vehicle. As an alternative, the heat thereby released can be dissipated to the air which flows through the heat exchanger and which can be fed into the interior of the vehicle.

When using an external heat exchanger which absorbs energy from the air and which can have surface temperatures below the freezing point, the moist air at the heat exchanger can freeze at outside temperatures around the freezing point. This can negatively influence the heat transfer and therefore the efficiency of heat transmission to the air. In addition, a flow path of the air can at least partially be blocked, in some cases be blocked even completely by a growing ice layer.

For this reason, the heat pump mode of air conditioning systems is provided with a deicing mode in which the frozen condensate can be thawed again. In this connection, switching between the deicing mode, which is also referred to as thawing mode, and a heating mode is normally known per se. In a first method, switching the process from a heating mode, in which icing can occur, to a deicing mode is provided. However, for the duration of the deicing mode, no heat can be extracted from the air. This reduces the overall efficiency of the heat pump. In a second method known per se, switching from the heating mode to the deicing mode takes place as well, but heat is extracted from a buffer storage. Here, the buffer storage contains a hot carrier medium which is fed through the cold external heat exchanger and can deice the latter in this manner. Such buffer storages are voluminous and result in additional weight of the motor vehicles.

SUMMARY OF THE INVENTION

It is therefore an object of the present invention to provide an improved air conditioning system which can also be operated in a heat pump mode at low outside temperatures.

An exemplary embodiment of the invention relates to an air conditioning system, in particular for a motor vehicle, comprising a refrigerant circuit having at least one compressor, and comprising a coolant circuit having an external heat exchanger that is integrated in a heat pump system, wherein a redundant heat source is provided, which is integrated in the heat pump system. In addition to the compressor, the refrigerant circuit preferably has an evaporator, an internal heat exchanger, a collecting tank for refrigerant and a condenser as well as an expansion element. The coolant circuit comprises a heater through which heated coolant, typically cooling water, can flow. Air flowing through the heater can thereby be heated and can flow into the passenger compartment of the vehicle so as to heat the latter. By means of the heat pump system, energy can be extracted from the ambient air passing along the external heat exchanger and can be used for heating the cooling water. Overall, in turn, energy for heating the passenger compartment can be saved through this, and the range of an electric vehicle can be increased, for example. The redundant heat source is preferably only connected if an additional energy source needs to be added to the heat source "air" in the heat pump system, and/or if the heat source "air" is not available due to low outside temperatures. The redundant heat source can be used here to increase the temperature of the cooling water which circulates in the coolant circuit. In particular, the redundant heat source is used when the heat source "air" is not available during a deicing mode or thawing process. The time needed for carrying out a thawing process (thawing time) can be bridged here without the temperature at a heater arranged in the coolant circuit falling below a setpoint value. A setpoint value also depends in particular on the outside temperature and is 40° C., for example. The term "redundant" refers here to the fact that the heat source is an additional heat source in addition to the heat source "air" that is used in "normal operation". The advantage of using the redundant heat source is that the temperature at the heater and thus in the interior of the vehicle is not necessarily reduced, in particular not during the thawing process. Thus, the heat pump system can be used in an electric vehicle without resulting in a loss of comfort for the driver due to insufficient and thus poor heating of the passenger compartment. The heat pump system as a whole is preferably characterized by low energy consumption compared with a conventional heating system.

The redundant heat source can be arranged in the flow of the external heat exchanger. The redundant heat source is placed immediately upstream of the external heat exchanger and therefore virtually at the same location in the coolant circuit. The redundant heat source can virtually replace the external heat exchanger without the need of taking additional measures to control volume flows of the coolant water by suitable valves in such a manner, for example, that overall no difference is noticeable in the effectiveness of the heat pump system. Also, a radiator shutter can be used as an additional measure so as to be able to guide the air flow through the radiator.

Furthermore, the refrigerant circuit can operate in the "heating" mode. The coolant temperature T1 downstream of the outer heat exchanger is preferably detected as a measure for the end of the thawing process.

In an advantageous configuration of the air conditioning system, the compressor can be operated with different rotational speeds. Here, the rotational speed can be reduced during the thawing process. A reduced rotational speed is particularly advantageous during the thawing process. On the one hand, this enables to generate less excessive heating energy, which is not needed, at the heater. On the other hand, the evaporation pressure can increase due to the low rotational speed. Furthermore, the evaporation temperature and the temperature of the coolant, which flows from the evaporator towards the external heat exchanger, can also increase. Through this, a reduction of the time period required until the cooling water temperature has reached a setpoint value of T1 can be achieved. A required energy value, which is needed until reaching a temperature threshold at which thawing of the external heat exchanger is assumed to be completed, for example 2° C., can be reduced here, as could be shown through simulation calculations.

As an alternative embodiment of the air conditioning circuit, the redundant heat source can be arranged in the flow of a heater arranged in the coolant circuit. However, this may require optimization of the volume flows of the coolant in the coolant circuit. Here, a volume flow V1 passing through the external heat exchanger is between 0 and 300 l/h, approximately 170 l/h, for example. In the case of an excessive volume flow V2, for example between 200 and 800 l/h, preferably 600 l/h, this can result in a low achievable temperature at the heater. Controlling the volume flow of the coolant can be achieved by suitable valves in the coolant circuit. Proportional valves are preferably used here. Hereby, the volume flow can be continuously controlled, in particular during the thawing process.

The redundant heat source can be an electrical heat source, in particular an electrical heating device. Electrical heating devices can be quickly switched on and off. Furthermore, electrical heating devices can also be controlled in a simple manner. Moreover, electrical heating devices can also be integrated later into existing heat pump systems.

The object is also achieved by a motor vehicle having an air conditioning system according to the invention, wherein an external heat exchanger is arranged as a heat pump in a heat pump system, and a redundant heating device is arranged as a redundant heat source in the flow of the external heat exchanger. Here, the motor vehicle is preferably an electric vehicle which is operated by means of a battery. As an alternative, the motor vehicle can also be a hybrid vehicle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
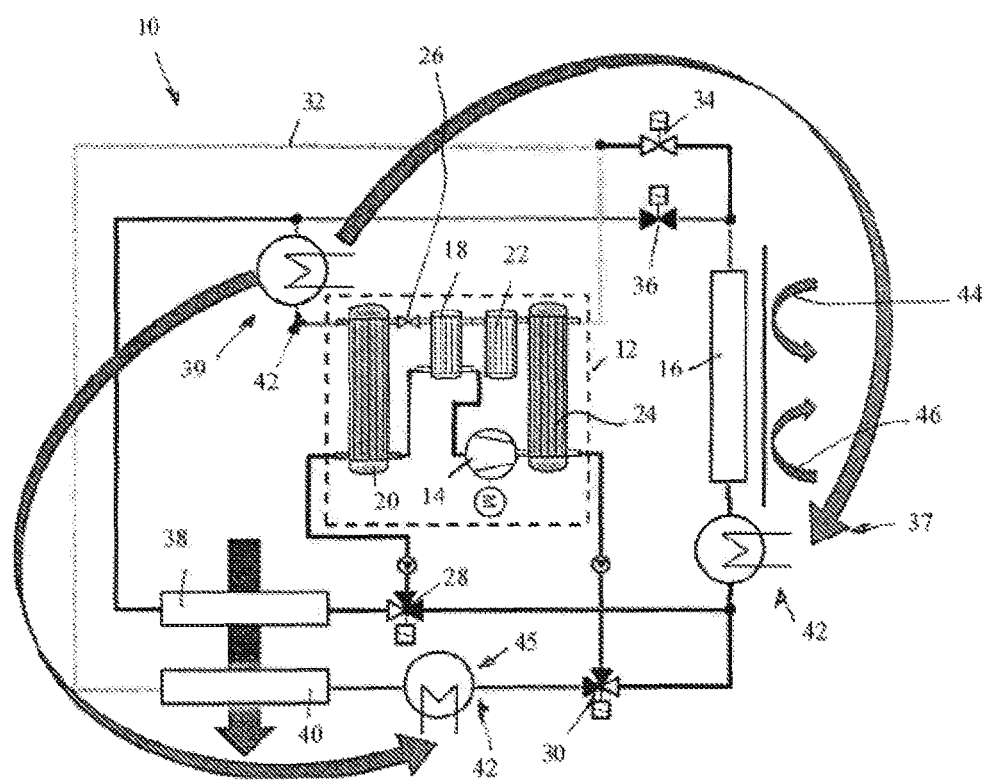
FIG. 1 shows an air conditioning system according to the invention with a redundant heat source.

FIG. 1 shows a heat pump system 10 of an air conditioning system, which is not illustrated in detail, of a motor vehicle which is not illustrated. The air conditioning system can serve for air-conditioning an interior of the motor vehicle. The heat pump system 10 has a coolant circuit 32 and a refrigerant circuit 12. The refrigerant circuit 12 is a closed circuit through which a refrigerant can flow. The refrigerant circuit 12 has, among other things, a compressor 14, an internal heat exchanger 18, an evaporation unit 20 that operates as a chiller, a collecting tank 22 and in indirect condenser 24. In addition to an external heat exchanger 16 and valves 28, 30, 34 and 36, a cooler 38 and a heater 40 are arranged in the coolant circuit 32. The expansion valve of the refrigerant circuit is designated with 26. A redundant heat source 42 can principally be arranged at three positions 37, 39 45. Position 37 is arranged in the flow of the external heat exchanger 16. The position having the reference number 39 marked in the Figure designates the position in the flow of the heater 40.

The valves 28, 30 are preferably formed as three-way valves 28, 30. More preferably, they are formed as solenoid valves. The valves 34 and 36 are formed as shut-off valves.

During operation of the air conditioning system, air that is designated with the arrows 44 and 46 flows past the external heat exchanger 16 thereby extracting heat from the air. Thus, the external heat exchanger 16 supplies the coolant circuit 32 with energy in the form of heat. The evaporation unit 20 and the indirect condenser 24 are also connected to the coolant circuit 32. Through this, energy can be transferred from the refrigerant circuit 12 to the cooling water in the cooling water circuit 32.

The redundant heat source 42 can be an electric heating device 42, which can easily be connected and disconnected. For this purpose, a control and regulating device can be provided which operates by using measured temperatures of the coolant in the coolant circuit 32 or of the outside air at the motor vehicle as the input control variable, for example. The redundant heat source 42 serves as an additional heat source for providing energy in a thawing mode, in particular at low outside temperatures and/or when condensate has accumulated in the external heat exchanger 16. In the thawing mode 16, the external heat exchanger serving as a heat pump is virtually replaced in its function as an energy source by the redundant heat source 42. Hereby, the desired temperature of the cooling water at the location of the heater 40 can be maintained. Through this, the air temperature in the interior of the vehicle can remain the same even if the energy source "air" is no longer available.

The position 37 of the redundant heat source 42 is the preferred position here. Here, the redundant heat source 42 is arranged directly upstream of the outside heat exchanger 16. If the redundant heat source 42 is arranged in position 39, it is additionally needed to reduce the volume flow of the cooling water flowing through the external heat exchanger 16. This, for example, can be carried out with proportional valves by means of which the volume flow can be adjusted.

The redundant heat source 42 typically has an output of approximately 5 kW, preferably between 4 and 5 kW. However, heat sources, in particular electrical heat sources, which have a different output can also be used and can be controlled as needed. If the temperature is too low and/or the external heat exchanger is iced up, the temperature of the coolant is no longer sufficient and the redundant heat source 42 is connected. At position 37, directly upstream of the external heat exchanger 16, energy, for example in the form of heat energy, can be fed to the cooling water flowing through the external heat exchanger. There are no losses through or in the line system.

The redundant heat source 42 is used when the air conditioning system is in the thawing mode since here the heat source "air" is not available at the external heat exchanger 16. The redundant heat source 42 is switched on exactly as long as the thawing mode is switched on. The air conditioning system can be operated in a mode in which a heating mode alternates with a thawing mode. Here, the redundant heat source 42 is then connected and disconnected accordingly.

Figure 2:
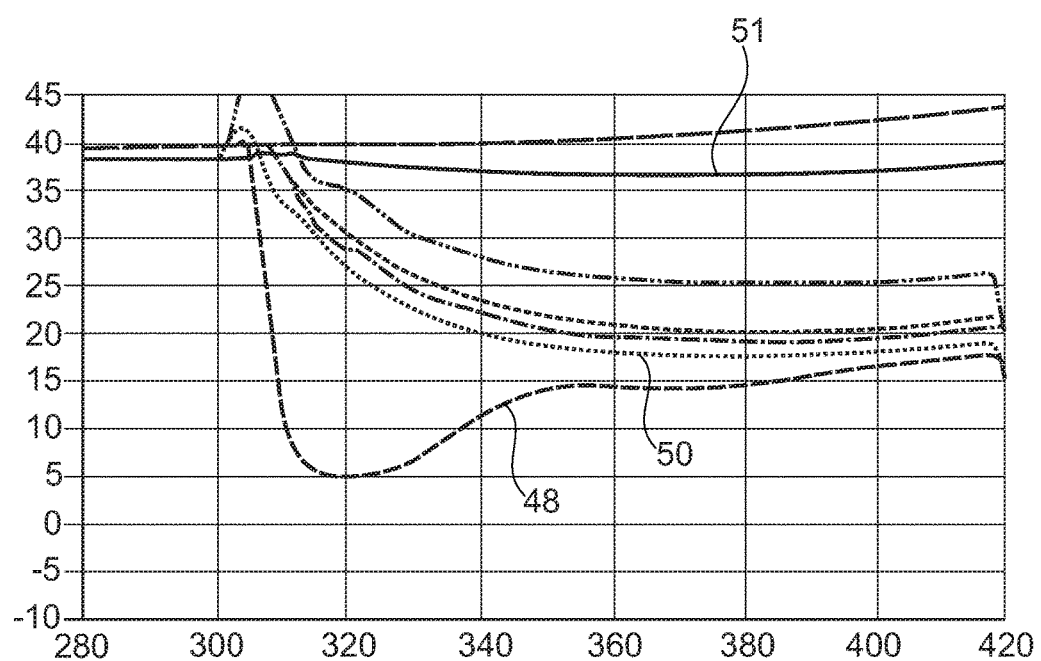
FIG. 2 shows a diagram of air temperature values at the heater.

In FIG. 2, the air temperature at the heater 40 is plotted in a diagram on the y-axis as a function of time, plotted on the x-axis. A line with the reference number 48 describes the progression of the air temperature at the heater in the thawing process using the redundant heat source 42 at the position 39 without volume correction. Here, the entire volume flow flows through the external heat exchanger 16. As a result, the overall temperature at the heater 40 drops significantly. A line with the reference number 50 shows the temperature progression for a corrected volume flow at a position in the flow of the heater. It is apparent that the temperature drop is less significant here.

The line with the reference number 51 represents the temperature progression which can be achieved when the heat source is arranged at the position 37. It is clearly visible that the position 39 for the arrangement of the redundant heat source 42 upstream of the external heat exchanger 16 leads to the best results for the air temperature at the heater 40.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An air conditioning system for a motor vehicle, comprising: a refrigerant circuit having at least one compressor; and a coolant circuit having an external heat exchanger that is arranged in a heat pump system, the external heat exchanger being a first heat source in the heat pump system, wherein a redundant heat source is integrated in the heat pump system, the redundant heat source being a second heat source in the heat pump system wherein the redundant heat source is arranged directly upstream of the external heat exchanger; and an internal heat exchanger arranged between a collecting tank and an evaporation unit of the refrigerant circuit.

2. The air conditioning system according to claim 1, wherein the compressor is operated with different rotational speeds.

3. The air conditioning system according to claim 1, wherein the coolant circuit includes a heater and wherein the redundant heat source is arranged in a flow of the coolant circuit downstream of the heater.

4. The air conditioning system according to claim 1, wherein the redundant heat source is an electrical heat source.

5. The air conditioning system according to claim 4, wherein the electrical heat source is an electric heating device.

6. The air conditioning system according to claim 1, wherein a volume flow through the external heat exchanger is less than a total volume flow of the coolant circuit.

7. A motor vehicle comprising an air conditioning system according to claim 1.

* * * * *